US008086062B2

(12) United States Patent
Lin et al.

(10) Patent No.: US 8,086,062 B2
(45) Date of Patent: Dec. 27, 2011

(54) CONTENT-ADAPTIVE FILTER TECHNIQUE

(75) Inventors: Shu Lin, Santa Clarita, CA (US); Auke Sjoerd Vanderschaar, Los Angeles, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 711 days.

(21) Appl. No.: 12/225,403

(22) PCT Filed: Apr. 11, 2006

(86) PCT No.: PCT/US2006/013504
§ 371 (c)(1),
(2), (4) Date: Sep. 19, 2008

(87) PCT Pub. No.: WO2007/117240
PCT Pub. Date: Oct. 18, 2007

(65) Prior Publication Data
US 2010/0296737 A1 Nov. 25, 2010

(51) Int. Cl.
*G06K 9/40* (2006.01)
(52) U.S. Cl. .................. 382/260; 382/274; 382/275
(58) Field of Classification Search .................. 382/260, 382/274, 275
See application file for complete search history.

(56) References Cited

U.S. PATENT DOCUMENTS

| | | | |
|---|---|---|---|
| 4,058,836 A * | 11/1977 | Drewery et al. | |
| 5,343,309 A * | 8/1994 | Roetling | |
| 7,092,482 B2 * | 8/2006 | Besson | 378/37 |
| 7,277,206 B2 * | 10/2007 | Trifonov et al. | 358/3.23 |
| 7,308,139 B2 * | 12/2007 | Wentland et al. | 382/181 |
| 7,363,180 B2 * | 4/2008 | Swaringen et al. | 702/85 |
| 7,515,763 B1 * | 4/2009 | Zhong | 382/254 |
| 2002/0122602 A1 * | 9/2002 | Rouvellou | |
| 2005/0100235 A1 * | 5/2005 | Kong et al. | |

FOREIGN PATENT DOCUMENTS

| | | | |
|---|---|---|---|
| EP | 1351508 | * | 10/2003 |
| FR | 2309095 | * | 12/1976 |
| GB | 2322252 | * | 8/1998 |

OTHER PUBLICATIONS

Turaga et al.: "Content-Adaptive Filtering in the UMCTF Framework", Proceedings 2003 International Conference on Multimedia and Expo, Pt. vol. 1, pp. I-821-I-84, IEEE, Piscataway, NJ, USA.
Chan et al.:"A Novel Content-Adaptive Video Denoising Filter", 2005 IEEE International Conference on Acoustics, Speech, and Signal Processing, Pt. vol. 2, p. ii/649-ii/652, Piscataway, NJ, USA.
Park et al.:"Spatially Adaptive Denoising Based on Nonstationary Correlation Assumption", Optical Engineering, vol. 43, No. 3, pp. 628-638, Mar. 2004, SPIE, USA.
Rangayyan et al.:"Adaptive-Neighborhood Filtering of Images Corrupted by Signal-Dependent Noise", Applied Optics, vol. 37, No. 20, pp. 4477-4487, Jul. 10, 1998, Opt. Soc. America, USA.
International Search Report, dated Nov. 7, 2006.

* cited by examiner

*Primary Examiner* — Yosef Kassa
(74) *Attorney, Agent, or Firm* — Robert D. Shedd; Robert B. Levy

(57) ABSTRACT

Selection of a filter for filtering an image to achieve fast noise reduction while retaining picture details and edge sharpness begins by first determining the detail throughout the image. Detection of the image edges then occurs. Using the image detail and edge information, the filter properties are selected, including the number of filter taps and the filter strength.

8 Claims, 5 Drawing Sheets

| -1 | 0 | +1 |
|---|---|---|
| -2 | 0 | +2 |
| -1 | 0 | +1 |

Vertical Kernel

| -1 | -2 | -1 |
|---|---|---|
| 0 | 0 | 0 |
| +1 | +2 | +1 |

Hotizontal Kernel

Pixel x,y

| p(x-3,y-3) | p(x-2,y-3) | ... |  |  |  | p(x+3,y-3) |
|---|---|---|---|---|---|---|
| ... |  |  |  |  |  |  |
|  |  |  |  |  |  |  |
|  |  |  | p(x,y) |  |  |  |
|  |  |  |  |  |  |  |
|  |  |  |  |  |  |  |
| p(x+3,y-3) |  |  |  |  |  | p(x+3,y+3) |

*FIG. 3A*

Next pixel

| p(.,.) | p(.,.) | ... |  |  |  | p(.,.) |
|---|---|---|---|---|---|---|
| ... |  |  |  |  |  |  |
|  |  |  |  |  |  |  |
|  |  |  | p(x+1,y) |  |  |  |
|  |  |  |  |  |  |  |
|  |  |  |  |  |  |  |
| p(.,.) |  |  |  |  |  | p(.,.) |

*FIG. 3B*

Pixel x,y

| Max(x-3) | | | | | | Max(x+3) |
|---|---|---|---|---|---|---|
| p(x-3,y-3) | p(x-2,y-3) | ... | | | | p(x+3,y-3) |
| ... | | | | | | |
| | | | | | | |
| | | | p(x,y) | | | |
| | | | | | | |
| | | | | | | |
| p(x+3,y-3) | | | | | | p(x+3,y+3) |

*FIG. 4A*

Next pixel

| Max(.,.) | | | | | | Max(x. |
|---|---|---|---|---|---|---|
| p(.,.) | p(.,.) | ... | | | | p(.,.) |
| ... | | | | | | |
| | | | | | | |
| | | | p(x+1,y) | | | |
| | | | | | | |
| | | | | | | |
| p(.,.) | | | | | | p(.,.) |

*FIG. 4B*

Possible filter directions and filter length

Chosen filter in the neighborhood of an edge

Frequency response of a 7-tap filters

Frequency response of a 5-tap filters

CONTENT-ADAPTIVE FILTER TECHNIQUE

This application claims the benefit, under 35 U.S.C. §365 of International Application PCT/US2006/013504 filed Apr. 11, 2006 which was published in accordance with PCT Article 21 (2) on Oct. 18, 2007 in English.

TECHNICAL FIELD

This invention relates to a technique for selecting a filter for filtering an image file that affords relatively fast operation while retaining picture details and sharpness.

BACKGROUND ART

Image files, such as those containing video or film images typically contain a certain amount of noise. In connection with images derived from film, film grain, caused by the random variations in density of the grains, manifests itself as noise. The storage of images containing video and/or film invariably requires a large amount of space, whereas the transmission of such files within a reasonable amount of time requires very high bandwidth. For that reason, image files containing video and/or film usually undergo compression prior to storage and/or transmission. The compression of noise (including film grain) has proven very difficult because of the lack of correlation with the image, whether video or film. For that reason, filtering of the image file prior to compression to remove noise becomes advantageous to achieve a high compression ratio.

Various techniques presently exist for noise filtering. However, such present day techniques often suffer from the disadvantage of being unable to offer fast performance while preserving image detail. Filtering techniques that afford high speed usually do not preserve sufficient image detail, whereas filter techniques that preserve image detail tend to run very slowly.

Thus, a need exists for a technique for filtering noise from an image that achieves both good speed while preserving image details.

BRIEF SUMMARY OF THE INVENTION

Briefly, in accordance with the present principles, there is provided a technique for selecting a filter for filtering an image to achieve fast noise reduction while retaining picture details and edge sharpness. The technique begins by determining the detail throughout the image. Detection of the image edges then occurs. Using the image detail and edge information, the properties of a filter for filtering the image are selected. As an example, the number of taps and their integer values can be selected using the image detail and edge information. The technique of the present principles achieves selection of a filter that affords a good tradeoff between speed and image detail through the use of content dependent spatial filtering.

BRIEF SUMMARY OF THE DRAWINGS

FIGS. 3A-3D each depict a 7×7 pixel image window to illustrate the method by which filtering occurs;

FIG. 4A depicts an image window to illustrate possible filter directions and filter lengths;

FIG. 4B depicts the image window of FIG. 3A showing a chosen filter in the neighborhood of an image edge.

DETAIL DESCRIPTION

Figures 1, 2A, 2B:
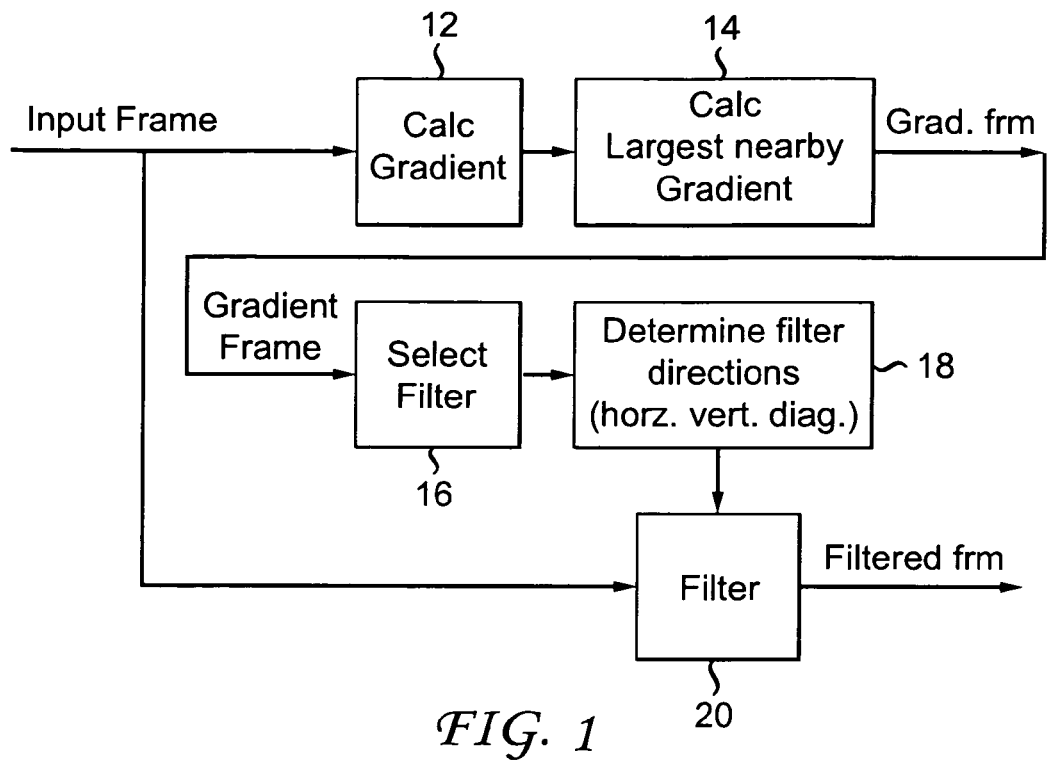
FIG. 1 depicts in flow chart form individual steps of a method according to the present principles for selecting a filter for filtering an image to reduce noise while maintaining picture detail and image edge sharpness.
FIGS. 2A and 2B depict vertical and horizontal kernels, respectively, of an image to illustratively indicate the manner by which edges within the image undergo detection.

FIG. 1 depicts in flow chart the process for selecting a filter in accordance with the present principles for filtering an image to reduce noise. The filter selection process of the present principles makes use of the image content to select the filter characteristics to so that the filter will maintain image detail and edge sharpness. The filter selection process commences by first determining detail within the image destined to undergo filtering. In the illustrative embodiment, detection of detail in the image occurs on a pixel by pixel basis during step 10 of FIG. 1 by establishing the gradient in image intensity between the pixel at position x and the pixel at position x−1. Mathematically, the pixel gradient can be expressed as $$\text{Grad}(x) = f(x) - f(x-1); \qquad \text{Equation (1)}$$

where Grad(x) is the gradient at position x, and f(k) is the pixel value at position k.

The local gradient determines the characteristics of the selected filter at that pixel. The magnitude of the gradient compared to each of a set of discrete threshold values determines the filter parameters, in particular the number of filter taps. For example, for the condition

| | |
|---|---|
| 0 <= gradient < threshold 1 | select 7 taps, |
| threshold 1 <= gradient < threshold 2 | select 5 taps. |
| threshold 2 <= gradient | select 3 taps. |

The difference between the gradient and the associated threshold determines the filter strength.

Using the above-described gradient adaptive approach can introduce jitter and other artifacts into the resultant image following filtering. In particular, jitter can result in the appearance of a filtered edge of the image if the filter characteristics change while filtering this edge. In accordance with an aspect of the present principles, reduced jitter will result by filtering an edge with a consistent filter (usually at the weakest strength) determined by the largest nearby edge, as detected using the largest nearby gradient calculated during step 12 of FIG. 1.

Performing the calculations to determine the largest nearby gradient to locate the largest nearby edge can consume many cycles of a central processing unit (not shown). The following optimization scheme can reduce the number of such cycles. Within a given image array of size N×M, where N and M are each integers, calculating the largest nearby gradient within each column, and then using the intermediate results from the columns will reduce the number of operations per pixel. To appreciate how this approach reduces the number of computations, consider a pixel window of size 7×7. Calculating the largest gradient G(x,y) within a window of that size would require 49 operations per pixel. However, calculating the largest gradient within each column and storing the results for subsequently determining the largest gradient for the window only requires 14 operations per pixel. The approach of calculating the gradient on a column by column basis for an array of 7×7 affords a speed advantage of 3.5 (49/14=3.5). This same technique can apply to calculating other parameters, such as the mean pixel intensity for example. FIGS. 3A and 3B illustrate image blocks showing an exemplary pixel (x, y) and a next pixel (x+1, y), respectively when using the traditional approach to calculating the largest nearby gradient on a pixel-by-pixel basis. FIGS. 4A and 4B FIGS. 3A and 3B illustrate image blocks showing an exemplary pixel (x, y) and a next pixel (x+1, y), respectively when using the technique of the present principles for computing the largest nearby gradient on a column by column basis and storing the result.

Various techniques exist for detecting the edges of the image. For example, a pair of Sobel filters having the filter characteristics illustrated by the Vertical and Horizontal Kernels shown in FIGS. 2A and 2B, respectively, can serve to estimate the edges of an image. Referring to FIG. 1, following step 12 during which calculation of the largest nearby gradient occurs to establish the desired filter parameters, then filter selection occurs during step 14. In the illustrated embodiment, three sets of filters, 3-tap, 5-tap and 7-tap, are used.

The 7-tap filters, have 11 integers from the highest strength to weakest and typically require scaling by 256. Table I lists an exemplary 7 tap filter.

TABLE I

| | | | | | | | |
|---|---|---|---|---|---|---|---|
| D(1, 1:7) = | [36 | 36 | 37 | 38 | 37 | 36 | 36]; |
| D(2, 1:7) = | [28 | 34 | 41 | 50 | 41 | 34 | 28]; |
| D(3, 1:7) = | [23 | 31 | 44 | 60 | 44 | 31 | 23]; |
| D(4, 1:7) = | [20 | 30 | 45 | 66 | 45 | 30 | 20]; |
| D(5, 1:7) = | [17 | 28 | 46 | 75 | 46 | 28 | 17]; |
| D(6, 1:7) = | [14 | 25 | 46 | 86 | 46 | 25 | 14]; |
| D(7, 1:7) = | [11 | 23 | 47 | 94 | 47 | 23 | 11]; |
| D(8, 1:7) = | [9 | 21 | 46 | 104 | 46 | 21 | 9]; |
| D(9, 1:7) = | [6 | 16 | 45 | 122 | 45 | 16 | 6]; |
| D(10, 1:7) = | [3 | 10 | 40 | 150 | 40 | 10 | 3]; |
| D(11, 1:7) = | [1 | 7 | 35 | 170 | 35 | 7 | 1]; |

The 5-tap filters have 10 integers and also typically require scaling need by 256: Table II lists an exemplary 7 tap filter.

TABLE II

| | | | | | |
|---|---|---|---|---|---|
| D(1, 1:5) = | [51 | 51 | 52 | 51 | 51]; |
| D(2, 1:5) = | [41 | 53 | 68 | 53 | 41]; |
| D(3, 1:5) = | [34 | 53 | 82 | 53 | 34]; |
| D(4, 1:5) = | [28 | 52 | 96 | 52 | 28]; |
| D(5, 1:5) = | [23 | 50 | 110 | 50 | 23]; |
| D(6, 1:5) = | [19 | 48 | 122 | 48 | 19]; |
| D(7, 1:5) = | [14 | 44 | 140 | 44 | 14]; |
| D(8, 1:5) = | [10 | 39 | 158 | 39 | 10]; |
| D(9, 1:5) = | [6 | 32 | 180 | 32 | 6]; |
| D(10, 1:5) = | [3 | 23 | 204 | 23 | 3]; |

The 3-tap filters have seven integers and typically require scaling by 256. Table III lists an exemplary 3 tap filter.

TABLE III

| | | | |
|---|---|---|---|
| D(1, 1:3) = | [85 | 86 | 85]; |
| D(2, 1:3) = | [70 | 116 | 70]; |
| D(3, 1:3) = | [57 | 142 | 57]; |
| D(4, 1:3) = | [47 | 162 | 47]; |
| D(5, 1:3) = | [38 | 180 | 38]; |
| D(6, 1:3) = | [30 | 196 | 30]; |
| D(7, 1:3) = | [22 | 212 | 22]; |

As discussed above, the filter selection technique of the present principles yields a filter that strives to preserve image edges while maintaining the same level of filtering. Optional step 18 can be performed after selection a particular filter length, which prevents filtering across edges. Upon detecting an image edge in the filtered direction, the filter strength will diminish, either by reducing the number of taps or not filtering at all in that particular direction. Following step 18, filtering of the image occurs in accordance with the selected filter during step 20.

Figure 5A:
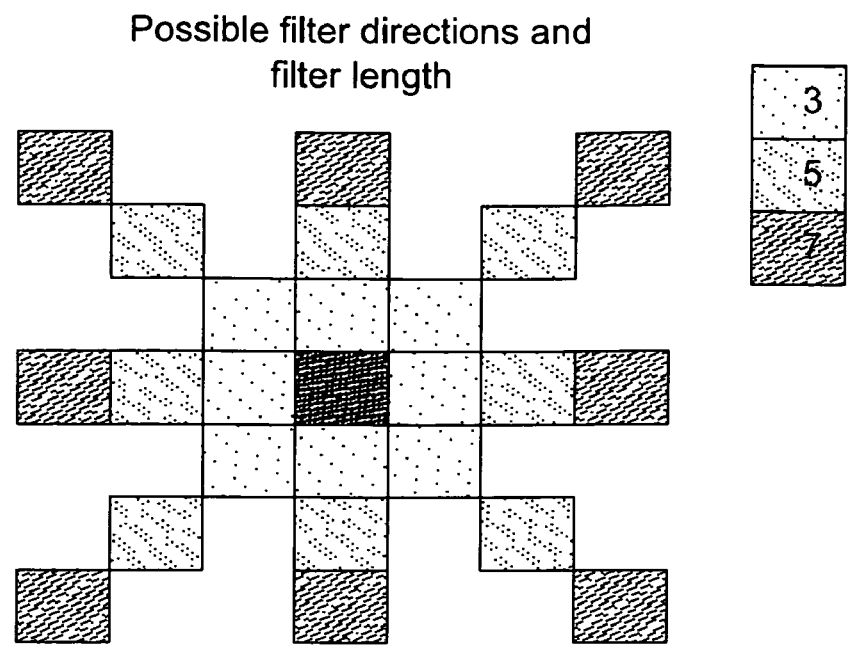
FIGS. 5, 6, and 7 each show the frequency response of a 7-tap, 5-tap and 3 tap filter, respectively, selected in accordance with the present technique.
Figure 5B:
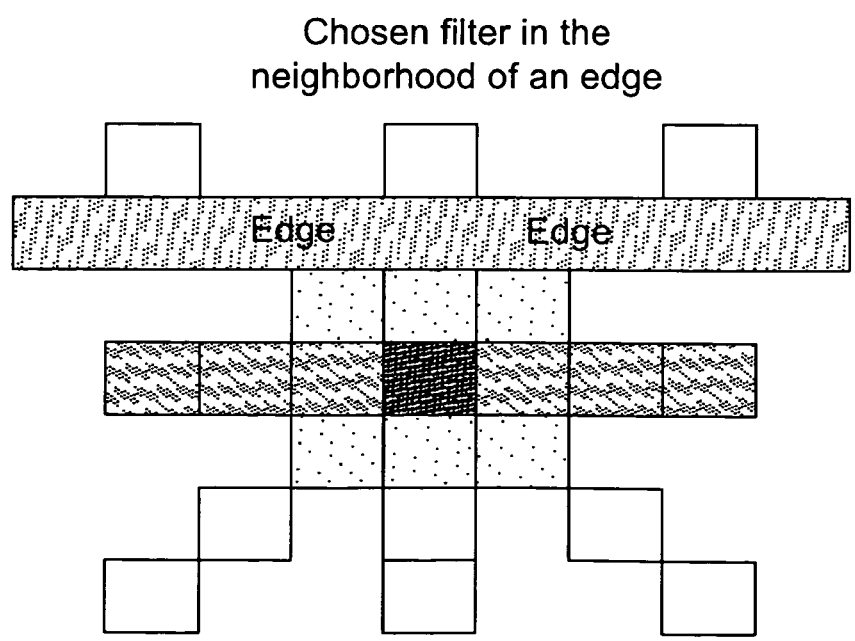
Figure 6:
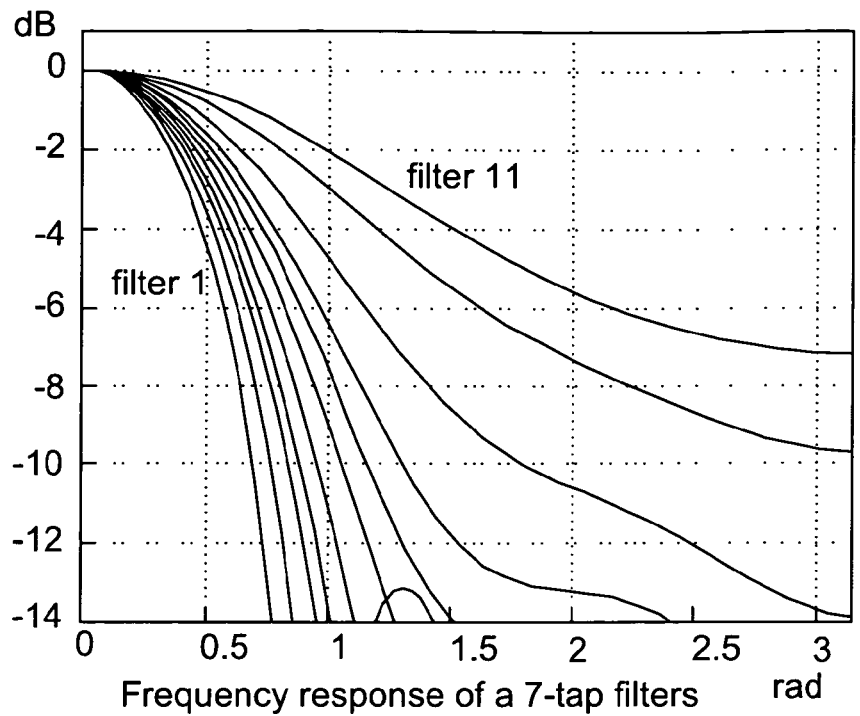
Figure 7:
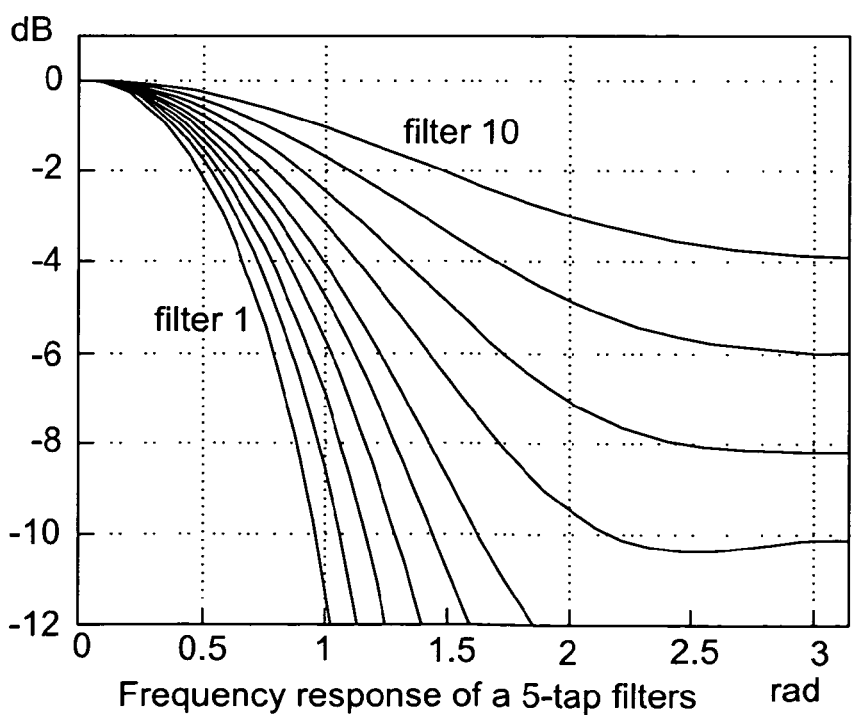

To better understand the process of choosing the filter in the neighborhood of an edge, refer to FIG. 5A which indicates through the use of different shadings, the potential of filtering in different directions from a central pixel P(x, y) using one of a 3-tap, 5-tap and 7-tap filters, respectively. Referring to FIG. 5B, upon detecting an edge in the image, which illustratively appears at the top of the figure, the filter strength will diminish.

The foregoing describes a technique for selecting a filter for image filtering that preserves image detail while affording good performance.

The invention claimed is:

1. A method for selecting a filter for filtering an image, comprising the steps of:
   determining the detail throughout the image by calculating a gradient for each pixel within the image;
   detecting the image edges; and
   selecting properties of a filter for filtering the image in accordance with the image detail and edges by (a) determining a quantity of filter taps depending on whether the pixel gradient exceeds different thresholds, and (b) determining the filter strength on the distance between the gradient and associated threshold.

2. The method according to claim 1 wherein the step of calculating the gradient further comprises the step of calculating a largest nearby gradient for each pixel.

3. The method according to claim 1 wherein the step of detecting the image edges further comprise the step of filtering the image with a Sobel filter.

4. The method according to claim 1 further including the step of filtering the image using with a filter having the selected properties.

5. A method for filtering an image, comprising the steps of:
   determining the detail throughout the image by calculating a gradient for each pixel within the image;
   detecting the image edges
   selecting properties of a filter for filtering the image in accordance with the image detail and edges by determining a quantity of filter taps depending on whether the pixel gradient exceeds different thresholds, and determining the filter strength on the distance between the gradient and associated threshold; and
   filtering the image with a filter having the selected properties.

6. The method according to claim 5 wherein the filtering step further comprises the step of filtering images edges with weak filtering strength.

7. The method according to claim 5 wherein the step of calculating the gradient further comprises the step of calculating a largest nearby gradient for each pixel.

8. The method according to claim 5 wherein the step of detecting the image edges further comprise the step of filtering the image with a Sobel filter.

* * * * *